United States Patent
Hattass et al.

(10) Patent No.: US 10,030,977 B2
(45) Date of Patent: Jul. 24, 2018

(54) MULTIAXIAL ROTATION RATE SENSOR INCLUDING A SPLIT CENTRAL ROTOR

(71) Applicant: Robert Bosch GmbH, Stuttgart (DE)

(72) Inventors: Mirko Hattass, Stuttgart (DE); David Csima, Pécs (DE); Thorsten Balslink, Kirchentellinsfurt (DE)

(73) Assignee: ROBERT BOSCH GMBH, Stuttgart (DE)

( * ) Notice: Subject to any disclaimer, the term of this patent is extended or adjusted under 35 U.S.C. 154(b) by 257 days.

(21) Appl. No.: 15/205,287

(22) Filed: Jul. 8, 2016

(65) Prior Publication Data

US 2017/0016726 A1   Jan. 19, 2017

(30) Foreign Application Priority Data

Jul. 17, 2015   (DE) .................. 10 2015 213 465

(51) Int. Cl.
*G01C 19/5747*   (2012.01)
*G01C 19/5733*   (2012.01)

(52) U.S. Cl.
CPC ..... *G01C 19/5747* (2013.01); *G01C 19/5733* (2013.01)

(58) Field of Classification Search
CPC ................. G01C 19/5733; G01C 19/5747
See application file for complete search history.

(56) References Cited

U.S. PATENT DOCUMENTS

| 8,539,833 B2* | 9/2013 | Amemiya | G01C 19/5607 |
| | | | 73/504.12 |
| 9,739,613 B2* | 8/2017 | Coronato | G01C 19/5747 |
| 2010/0122577 A1* | 5/2010 | Neul | G01C 19/5726 |
| | | | 73/504.12 |
| 2014/0116135 A1* | 5/2014 | Cazzaniga | G01C 19/5747 |
| | | | 73/504.12 |
| 2016/0370182 A1* | 12/2016 | Shao | G01C 19/5769 |

FOREIGN PATENT DOCUMENTS

DE   102009027897   1/2011

* cited by examiner

*Primary Examiner* — Francis C Gray
(74) *Attorney, Agent, or Firm* — Norton Rose Fulbright US LLP; Gerard Messina

(57) ABSTRACT

A multiaxial rotation rate sensor for detecting rotation rates on three mutually perpendicular rotation axes.

8 Claims, 5 Drawing Sheets

MULTIAXIAL ROTATION RATE SENSOR INCLUDING A SPLIT CENTRAL ROTOR

CROSS REFERENCE

The present application claims the benefit under 35 U.S.C. § 119 of German Patent Application Ser. No. DE 102015213465.2 filed on Jul. 17, 2015, which is expressly incorporated herein by reference in its entirety.

BACKGROUND INFORMATION

The present invention is directed to a rotation rate sensor.

A rotation rate sensor is described in German Patent Application No. DE 10 2009 027 897 A1, for example.

SUMMARY

An example rotation rate sensor according to the present invention may have the advantage over the related art that a multichannel rotation rate sensor is made possible on a substrate surface which is small relative to the related art, since the micromechanical structure of the rotation rate sensor requires only a substrate surface which is small relative to the related art for detecting rotation rates about up to three mutually perpendicular rotation axes.

This is achieved in that in the rotation rate sensor according to the present invention, the first detection structure and the second detection structure are coupled with the aid of a coupling structure in such a way that in the case of a first rotation rate about an axis generally in parallel to a third axis extending perpendicular with respect to the main plane of extension and/or in the case of a second rotation rate about an axis generally in parallel to a fourth axis extending in parallel to the main plane of extension and perpendicular with respect to the drive direction, a first action of force on the first detection structure and a second action of force on the second detection structure generally perpendicular to the drive direction are detectable, the first action of force and the second action of force being generally in phase opposition, the third detection structure and the fourth detection structure being coupled with the aid of the coupling structure in such a way that in the case of the second rotation rate and/or in the case of a third rotation rate about an axis generally in parallel to a fifth axis extending in parallel to the drive direction, a third action of force on the third detection structure and a fourth action of force on the fourth detection structure generally perpendicular to the main plane of extension are detectable.

A rotation rate sensor including linear oscillating structures and rotationally oscillating structures with a direct coupling of the individual structures to one another is thus provided, thus allowing the rotation rate sensor according to the present invention to be operated with a coupled detection mode. In addition, the rotation rate sensor according to the present invention has high symmetry compared to the related art, so that influences due to process variations and/or nonlinearities may be reduced. A rotation rate sensor which is insensitive to interfering influences due to vibrations, for example, is provided in a simple, mechanically robust, and cost-effective manner. The strength of interference signals, for example, is thus reduced compared to the related art.

Advantageous embodiments and refinements of the present invention are described below with reference to the figures.

According to one preferred refinement, it is provided that the drive device includes at least one electrostatic comb drive. A simple, mechanically robust, and cost-effective drive device is provided in this way.

According to one preferred refinement, it is provided that the coupling structure is designed in such a way that the first detection structure and the second detection structure are generally deflectable only in phase opposition due to the first action of force and due to the second action of force. This advantageously allows the rotation rate sensor according to the present invention to be operated with a coupled detection mode which is robust against linear accelerations. In addition, the coupling structure on the one hand allows a joint antiparallel detection mode (masses oscillate toward one another) of the detection structures, but on the other hand suppresses a parallel detection mode (masses oscillate in phase in the same direction). Furthermore, the coupling structure allows a rotary motion about a central suspension in the middle of the coupling structure.

According to one preferred refinement, it is provided that the rotation rate sensor includes a first detection unit for detecting a first component of the first action of force generally in parallel to the fourth axis, and a second detection unit for detecting a second component of the second action of force generally in parallel to the fourth axis, the first detection unit including at least one first electrode and the second detection unit including at least one second electrode, the first electrode and the second electrode having a generally plate-shaped design, and extending generally perpendicularly with respect to the main plane of extension, and being situated, at least partially, in each case in at least one recess of the particular detection structure. Detection of the first rotation rate by the rotation rate sensor is thus advantageously made possible. In addition, this advantageously allows the first rotation rate to be capacitively detected.

According to one preferred refinement, it is provided that the rotation rate sensor includes a third detection unit for detecting a third component of the first action of force generally in parallel to the third axis, and a fourth detection unit for detecting a fourth component of the second action of force generally in parallel to the third axis, the third detection unit including at least one third electrode and the fourth detection unit including at least one fourth electrode, the third electrode and the fourth electrode having a generally plate-shaped design, and extending generally in parallel to the main plane of extension, and being situated, at least partially, between the substrate and the particular detection structure and/or on the side of the particular detection structure facing away from the substrate. Detection of the second rotation rate by the rotation rate sensor is thus advantageously made possible. In addition, this advantageously allows the second rotation rate to be capacitively detected.

According to one preferred refinement, it is provided that the rotation rate sensor includes a fifth detection unit for detecting a fifth component of the third action of force generally in parallel to the third axis, and a sixth detection unit for detecting a sixth component of the fourth action of force generally in parallel to the third axis, the fifth detection unit including at least one fifth electrode and the sixth detection unit including at least one sixth electrode, the fifth electrode and the sixth electrode having a generally plate-shaped design, and extending generally in parallel to the main plane of extension, and being situated, at least partially, between the substrate and the particular detection structure and/or on the side of the particular detection structure facing away from the substrate. Detection of the third rotation rate by the rotation rate sensor is thus advantageously made possible. In addition, this advantageously allows the third rotation rate to be capacitively detected.

According to one preferred refinement, it is provided that the rotation rate sensor includes a seventh detection unit for detecting a seventh component of the third action of force in the sense of a torque about an axis generally in parallel to the fifth axis, and an eighth detection unit for detecting an eighth component of the fourth action of force in the sense of a torque about an axis generally in parallel to the fifth axis, the seventh detection unit including at least one seventh electrode and the eighth detection unit including at least one eighth electrode, the seventh electrode and the eighth electrode having a generally plate-shaped design, and extending generally in parallel to the main plane of extension, and being situated at least partially between the substrate and the particular detection structure and/or on the side of the particular detection structure facing away from the substrate. Detection of the second rotation rate by the rotation rate sensor is thus advantageously made possible. In addition, this advantageously allows the second rotation rate to be capacitively detected.

According to one preferred refinement, it is provided that the first component and/or the second component and/or the third component and/or the fourth component and/or the fifth component and/or the sixth component and/or the seventh component and/or the eighth component is/are capacitively and/or piezoresistively and/or piezoelectrically detectable. Detection of the first rotation rate and/or of the second rotation rate and/or of the third rotation rate is thus provided in a simple, mechanically robust, and cost-effective manner.

DETAILED DESCRIPTION OF EXAMPLE EMBODIMENTS

Figure 1:
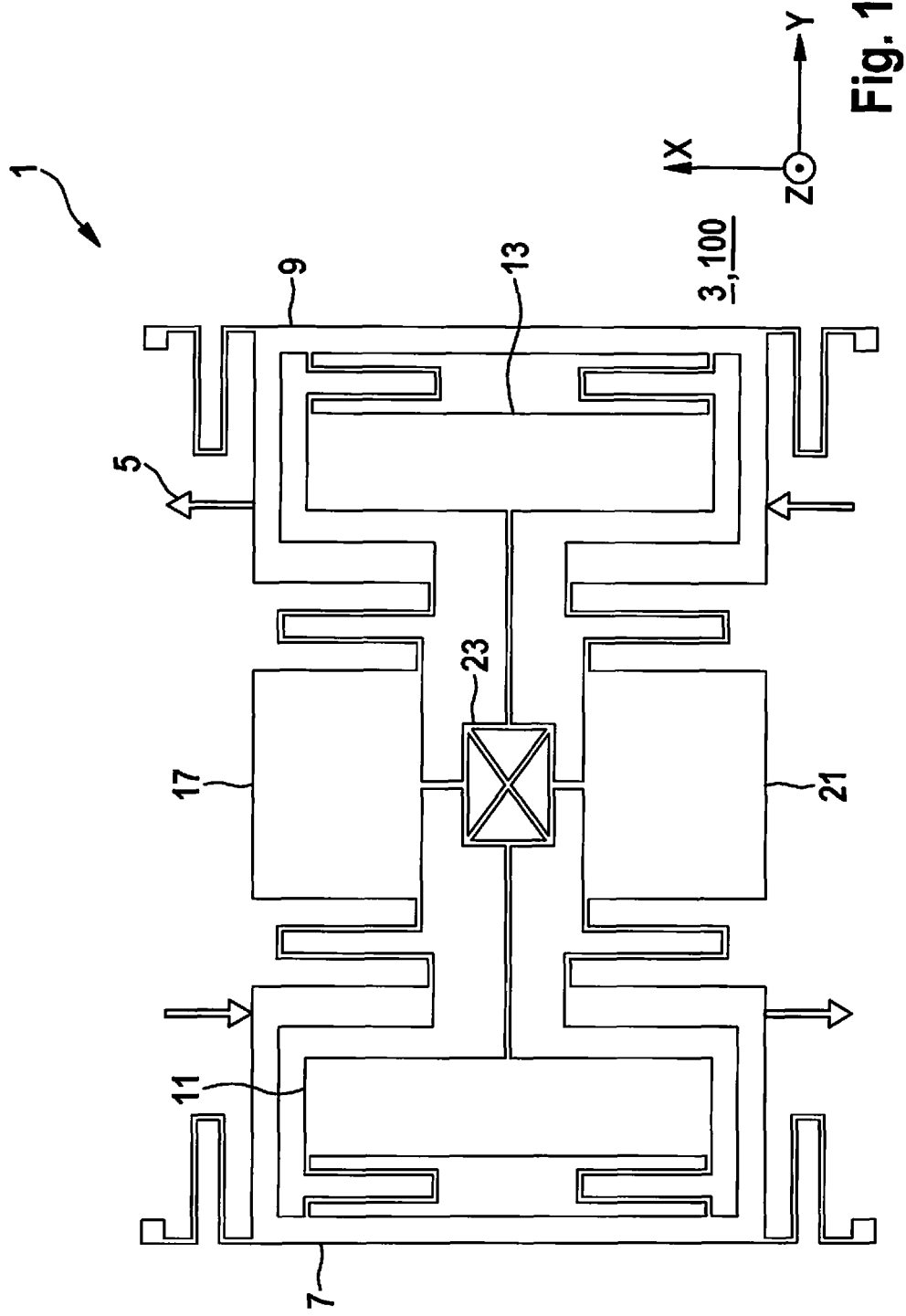
FIG. 1 shows a schematic illustration of a rotation rate sensor according to a first exemplary specific embodiment of the present invention.

Identical parts are provided herein with the same reference numerals in the various figures, and therefore are generally designated or mentioned only once in each case.

FIG. 1 shows a schematic illustration of a rotation rate sensor 1 according to a first exemplary specific embodiment of the present invention, rotation rate sensor 1 including a substrate 3 having a main plane of extension 100, and a first drive structure 7 and a second drive structure 9 which are movable relative to substrate 3 generally in parallel to a drive direction 5. In addition, rotation rate sensor 1 includes a first detection structure 11 which is drivable by first drive structure 7 generally in parallel to drive direction 5, and a second detection structure 13 which is drivable by second drive structure 9 generally in parallel to drive direction 5. Furthermore, rotation rate sensor 1 includes a third detection structure 17 which is drivable by first drive structure 7 and by second drive structure 9 in the sense of pivoting about a first axis extending perpendicularly with respect to main plane of extension 100, and a fourth detection structure 21 which is drivable by first drive structure 7 and by second drive structure 9 in the sense of pivoting about a second axis extending generally perpendicularly with respect to main plane of extension 100. In addition, rotation rate sensor 1 includes a drive device, not illustrated in FIG. 1, which preferably includes at least one electrostatic comb drive for deflecting first drive structure 7 and second drive structure 9 from a respective neutral position of the particular drive structure 7, 9 in such a way that first drive structure 7 and second drive structure 9 are excitable into an oscillation generally in phase opposition, in each case with a motion component generally in parallel to drive direction 5. First detection structure 11 and second detection structure 13 are coupled with the aid of a coupling structure 23 in such a way that in the case of a first rotation rate about an axis generally in parallel to a third axis Z and/or in the case of a second rotation rate about an axis generally in parallel to a fourth axis Y, a first action of force on first detection structure 11 and a second action of force on second detection structure 13 generally perpendicular to drive direction 5 are detectable. In this regard, the first action of force and the second action of force act generally in phase opposition. In addition, third detection structure 17 and fourth detection structure 21 are coupled with the aid of coupling structure 23 in such a way that in the case of the second rotation rate and/or in the case of a third rotation rate about an axis generally in parallel to a fifth axis X, a third action of force on third detection structure 17 and a fourth action of force on fourth detection structure 21 generally perpendicular to main plane of extension 100 are detectable.

Figure 2:
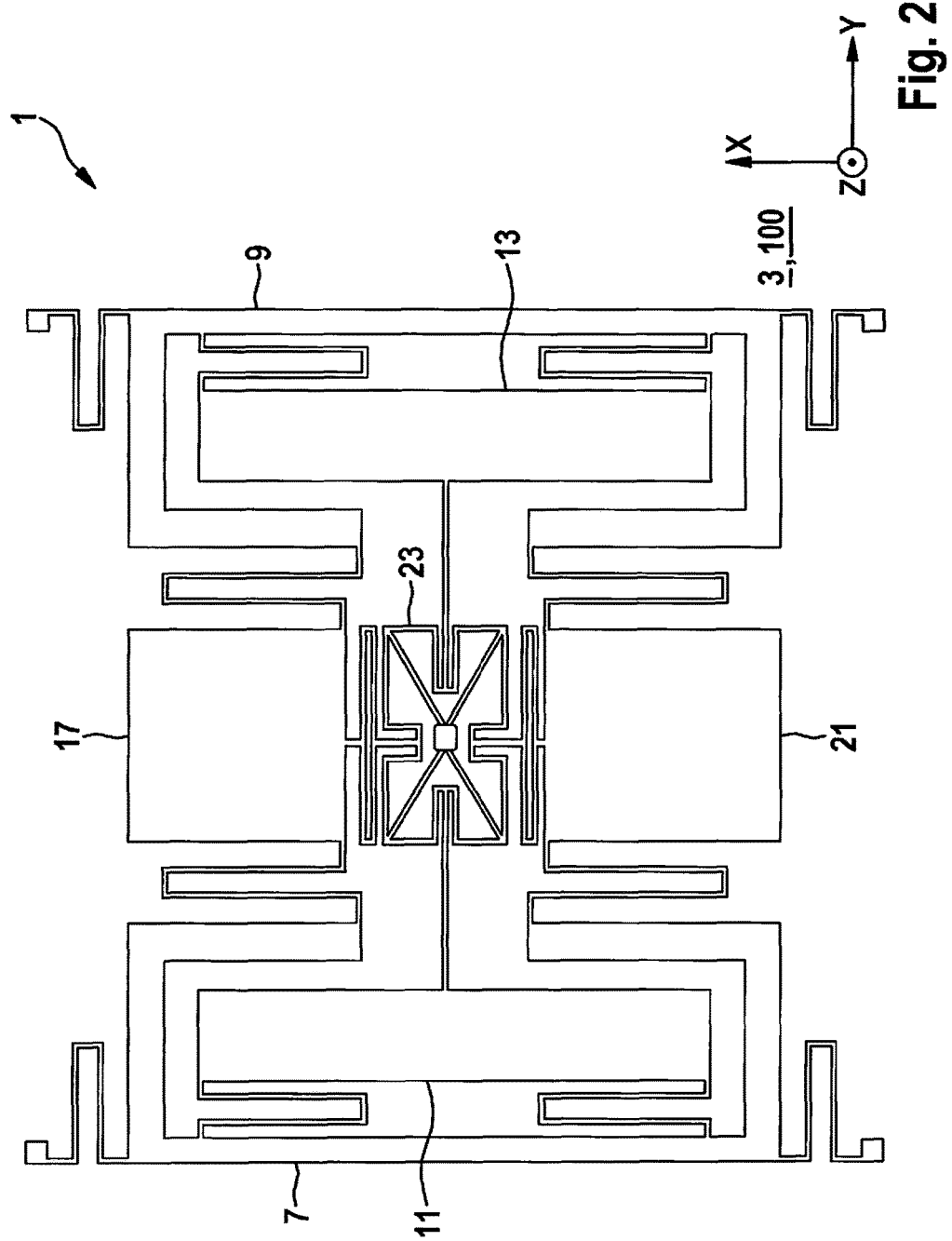
FIG. 2 shows a schematic illustration of a rotation rate sensor according to a second exemplary specific embodiment of the present invention.

FIG. 2 shows a schematic illustration of a rotation rate sensor 1 according to a second exemplary specific embodiment of the present invention. In FIG. 2, by way of example coupling structure 23 is designed in such a way that first detection structure 11 and second detection structure 13 are generally deflectable only in phase opposition due to the first action of force and due to the second action of force.

Figure 3:
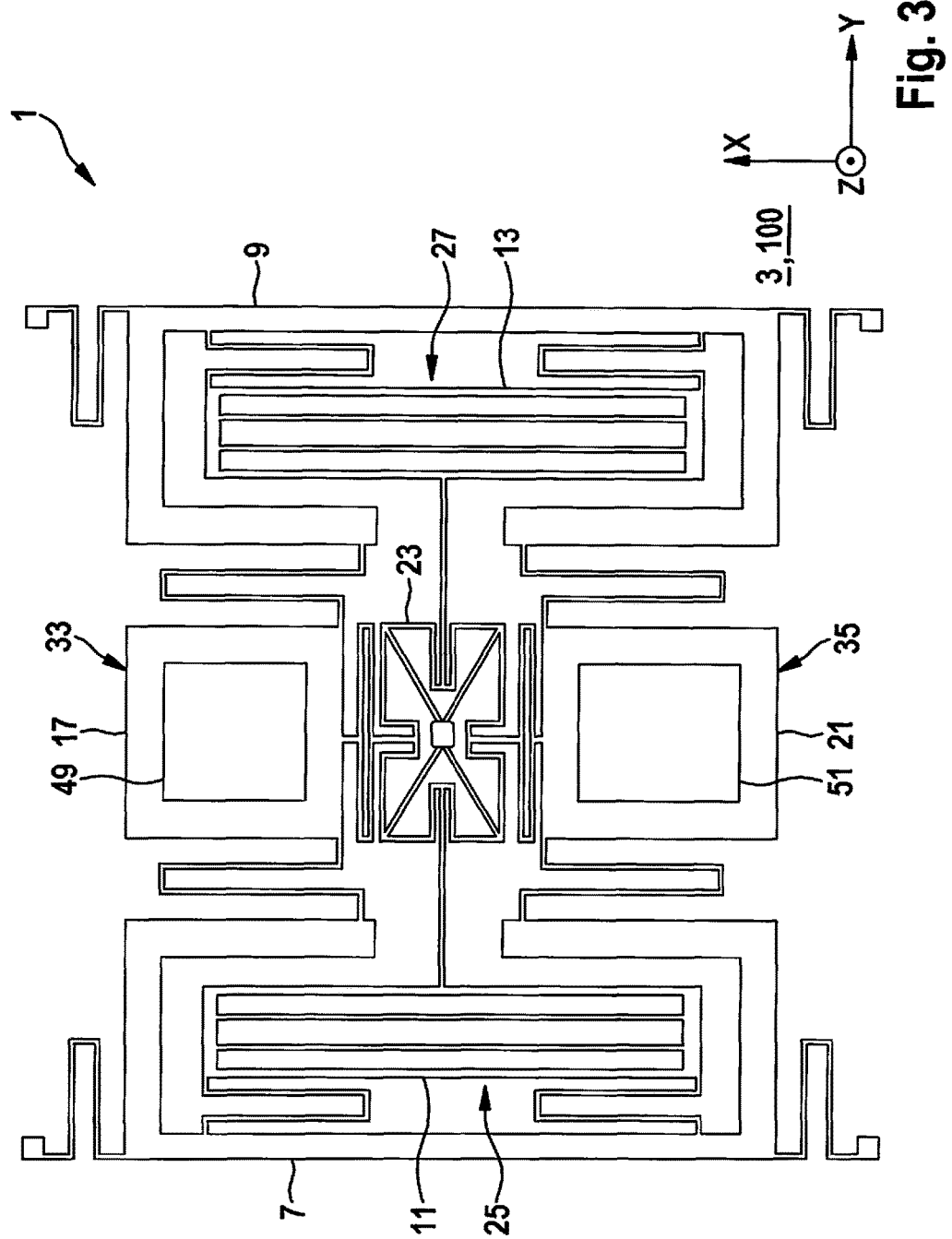
FIG. 3 shows a schematic illustration of a rotation rate sensor according to a third exemplary specific embodiment of the present invention.

FIG. 3 shows a schematic illustration of a rotation rate sensor 1 according to a third exemplary specific embodiment of the present invention. In FIG. 3, by way of example a first detection unit 25, including at least one first electrode, for example (not illustrated), for detecting a first component of the first action of force, and a second detection unit 27, including at least one second electrode, for example (not illustrated), for detecting a second component of the second action of force, in each case generally in parallel to fourth axis Y. The first electrode and the second electrode have an generally plate-shaped design, extend generally perpendicularly with respect to main plane of extension 100, and are situated, at least partially, in each case in one of the three recesses in each case in the particular detection structure 11, 13. In addition, FIG. 3 illustrates by way of example a fifth detection unit 33, including at least one fifth electrode 49, for detecting a fifth component of the third action of force, and a sixth detection unit 35, including at least one sixth electrode 51, for detecting a sixth component of the fourth action of force, in each case generally in parallel to third axis Z. Fifth electrode 49 and sixth electrode 51 have an generally plate-shaped design, extend generally in parallel to main plane of extension 100, and are situated, at least partially, between substrate 3 and the particular detection structure 17, 21, and/or on the side of the particular detection structure 17, 21 facing away from the substrate.

Figure 4:
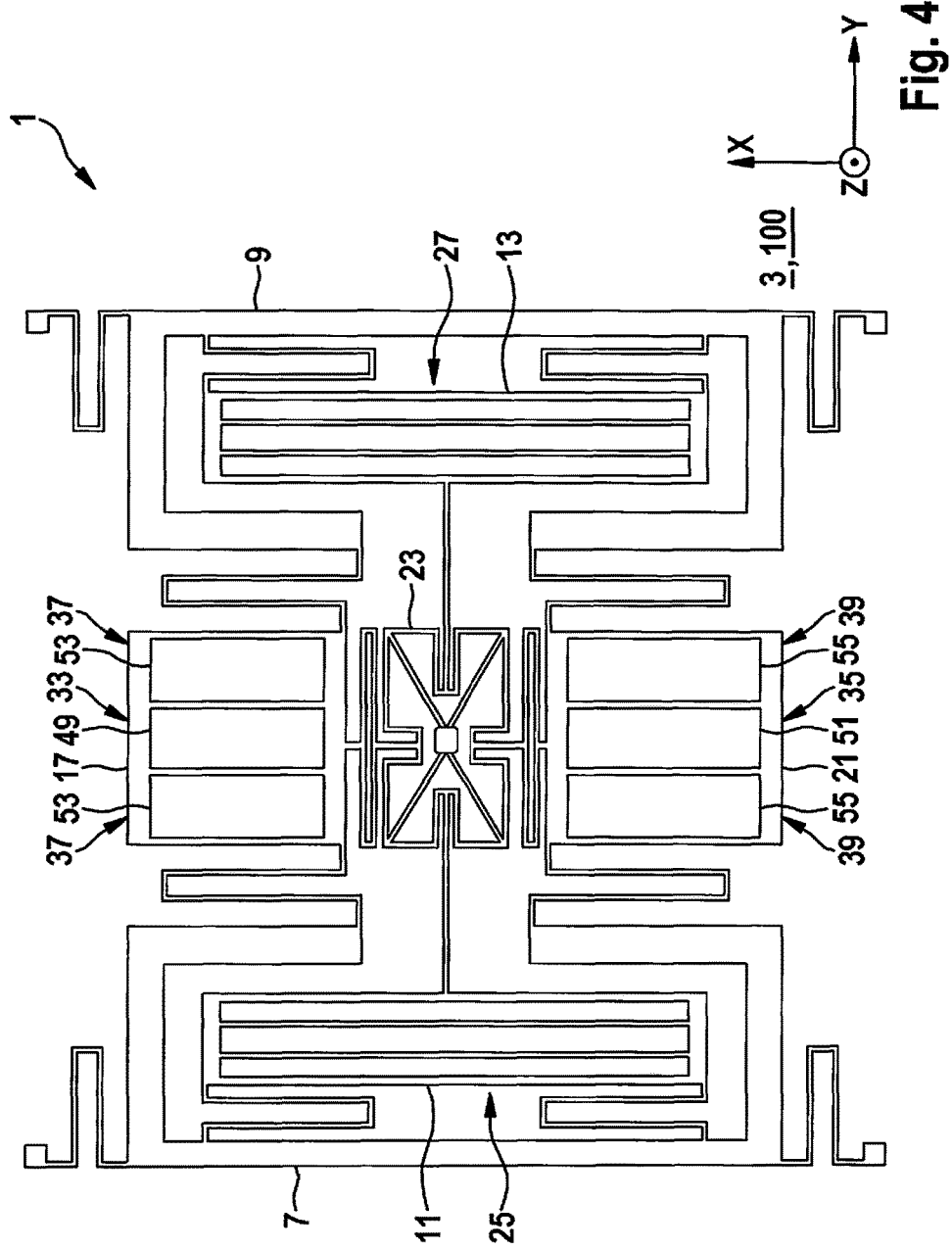
FIG. 4 shows a schematic illustration of a rotation rate sensor according to a fourth exemplary specific embodiment of the present invention.

FIG. 4 shows a schematic illustration of a rotation rate sensor 1 according to a fourth exemplary specific embodiment of the present invention. FIG. 4 shows by way of example a seventh detection unit 37, including at least one seventh electrode 53, for detecting a seventh component of the third action of force, and an eighth detection unit 39, including at least one eighth electrode 55, for detecting an eighth component of the fourth action of force, in each case in the sense of a torque about an axis generally in parallel to fifth axis X. Seventh electrode 53 and eighth electrode 55 have a generally plate-shaped design, extend generally in parallel to main plane of extension 100, and are situated, at least partially, between substrate 3 and the particular detection structure 17, 21, and/or on the side of the particular detection structure 17, 21 facing away from the substrate.

Figure 5:
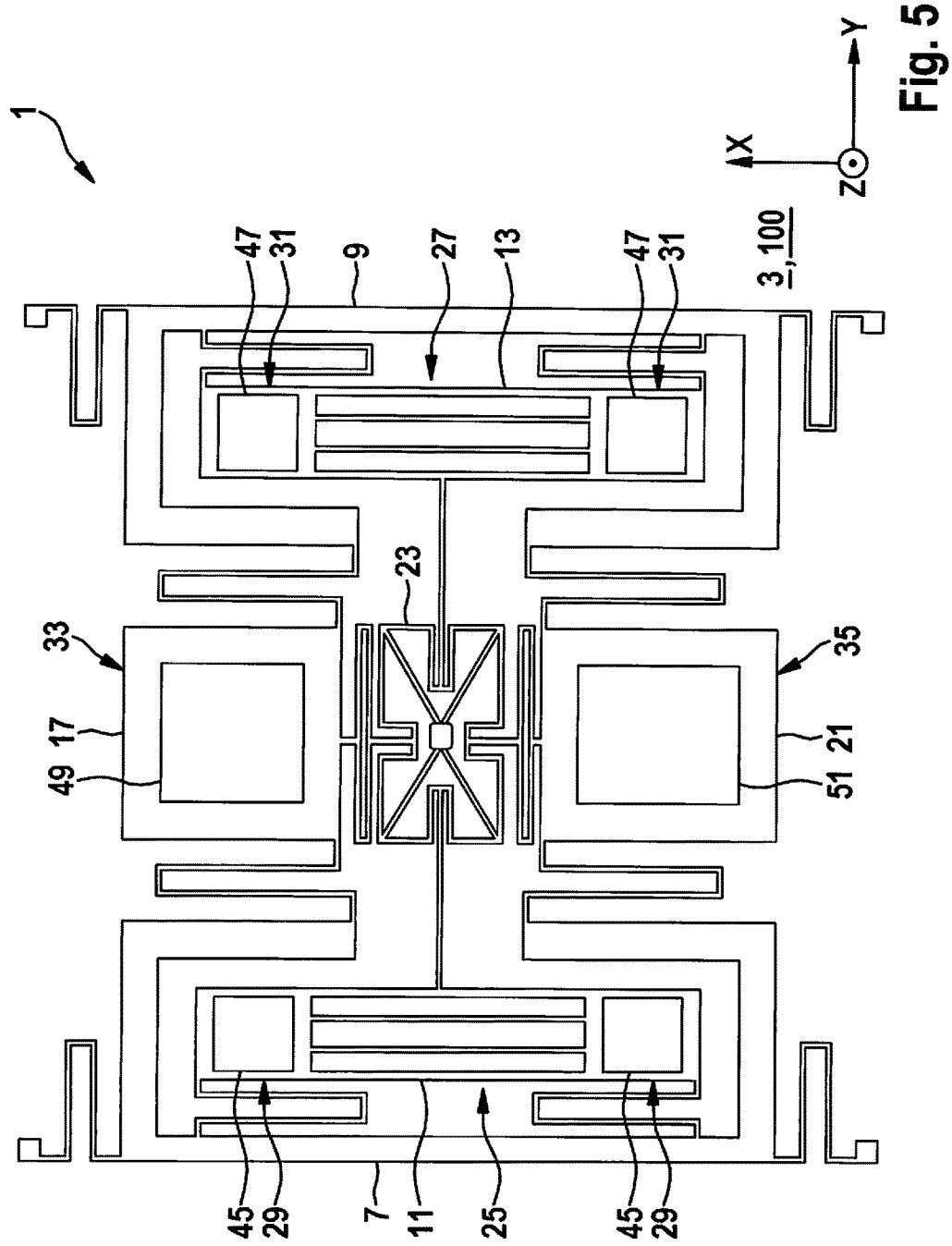
FIG. 5 shows a schematic illustration of a rotation rate sensor according to a fifth exemplary specific embodiment of the present invention.

FIG. 5 shows a schematic illustration of a rotation rate sensor 1 according to a fifth exemplary specific embodiment of the present invention. FIG. 5 shows by way of example a third detection unit 29, including at least one third electrode 45, for detecting a third component of the first action of force, and a fourth detection unit 31, including at least one fourth electrode 47, for detecting a fourth component of the second action of force, in each case generally in parallel to third axis Z. Third electrode 45 and fourth electrode 47 have a generally plate-shaped design, extend generally in parallel to main plane of extension 100, and are situated, at least partially, between substrate 3 and the particular detection structure 11, 13, and/or on the side of the particular detection structure 11, 13 facing away from the substrate.

It is preferably provided that the first component and/or the second component and/or the third component and/or the fourth component and/or the fifth component and/or the sixth component and/or the seventh component and/or the eighth component is/are capacitively and/or piezoresistively and/or piezoelectrically detectable. In addition, rotation rate sensor 1 is preferably provided with a partial quantity of possible detection units 25, 27, 29, 31, 33, 35, 37, 39, whereby the absence of any detection unit 25, 27, 29, 31, 33, 35, 37, 39 as well as the presence of all detection units 25, 27, 29, 31, 33, 35, 37, 39 are permissible.

What is claimed is:

1. A rotation rate sensor, comprising:
a substrate having a main plane of extension;
a first drive structure which is movable relative to the substrate in parallel to a drive direction in parallel to the main plane of extension;
a second drive structure which is movable relative to the substrate and relative to the first drive structure in parallel to the drive direction;
a first detection structure which is movable relative to the substrate and drivable by the first drive structure in parallel to the drive direction;
a second detection structure which is movable relative to the substrate and drivable by the second drive structure in parallel to the drive direction;
a third detection structure which is movable relative to the substrate and drivable by the first drive structure and by the second drive structure in the sense of pivoting about a first axis extending perpendicularly with respect to the main plane of extension; and
a fourth detection structure which is movable relative to the substrate and drivable by the first drive structure and by the second drive structure in the sense of pivoting about a second axis extending perpendicularly with respect to the main plane of extension; and
a drive device for deflecting the first drive structure from a neutral position of the first drive structure and for deflecting the second drive structure from a neutral position of the second drive structure in such a way that the first drive structure and the second drive structure are excitable into an oscillation in phase opposition, in each case with a motion component in parallel to the drive direction;
wherein the first detection structure and the second detection structure are coupled with the aid of a coupling structure in such a way that:
at least one of: i) in the case of a first rotation rate about an axis in parallel to a third axis extending perpendicularly with respect to the main plane of extension, and ii) in the case of a second rotation rate about an axis in parallel to a fourth axis extending in parallel to the main plane of extension and perpendicularly with respect to the drive direction, a first action of force on the first detection structure and a second action of force on the second detection structure perpendicular to the drive direction are detectable, the first action of force and the second action of force being in phase opposition;
wherein the third detection structure and the fourth detection structure are coupled with the aid of the coupling structure in such a way that:
at least one of: i)in the case of the second rotation rate, and ii) in the case of a third rotation rate about an axis in parallel to a fifth axis extending in parallel to the drive direction, a third action of force on the third detection structure and a fourth action of force on the fourth detection structure perpendicular to the main plane of extension are detectable.

2. The rotation rate sensor as recited in claim 1, wherein the drive device includes at least one electrostatic comb drive.

3. The rotation rate sensor as recited in claim 1, wherein the coupling structure is designed in such a way that the first detection structure and the second detection structure are deflectable only in phase opposition due to the first action of force and due to the second action of force.

4. The rotation rate sensor as recited in claim 1, wherein the rotation rate sensor includes a first detection unit for detecting a first component of the first action of force in parallel to the fourth axis, and a second detection unit for detecting a second component of the second action of force in parallel to the fourth axis, the first detection unit including at least one first electrode and the second detection unit including at least one second electrode, the first electrode and the second electrode having a plate-shaped design, and extending perpendicularly with respect to the main plane of extension, and being situated, at least partially, in each case in at least one recess of the particular detection structure.

5. The rotation rate sensor as recited in claim 4, wherein the rotation rate sensor includes a third detection unit for detecting a third component of the first action of force in parallel to the third axis, and a fourth detection unit for detecting a fourth component of the second action of force in parallel to the third axis, the third detection unit including at least one third electrode and the fourth detection unit including at least one fourth electrode, the third electrode and the fourth electrode having a plate-shaped design, and extending in parallel to the main plane of extension, and being situated, at least partially, at least one of: i) between the substrate and the particular detection structure, and ii) on a side of the particular detection structure facing away from the substrate.

6. The rotation rate sensor as recited in claim 5, wherein the rotation rate sensor includes a fifth detection unit for detecting a fifth component of the third action of force in parallel to the third axis, and a sixth detection unit for detecting a sixth component of the fourth action of force in parallel to the third axis, the fifth detection unit including at least one fifth electrode and the sixth detection unit including at least one sixth electrode, the fifth electrode and the sixth electrode having a plate-shaped design, and extending in parallel to the main plane of extension, and being situated, at least partially, at least one of: i) between the substrate and the particular detection structure, and ii) on a side of the particular detection structure facing away from the substrate.

7. The rotation rate sensor as recited in claim 6, wherein the rotation rate sensor includes a seventh detection unit for detecting a seventh component of the third action of force in the sense of a torque about an axis in parallel to the fifth axis, and an eighth detection unit for detecting an eighth component of the fourth action of force in the sense of a torque about an axis in parallel to the fifth axis, the seventh detection unit including at least one seventh electrode and the eighth detection unit including at least one eighth electrode, the seventh electrode and the eighth electrode having a plate-shaped design, and extending in parallel to the main plane of extension, and being situated, at least partially, at least one of: i) between the substrate and the particular detection structure, and ii) on a side of the particular detection structure facing away from the substrate.

8. The rotation rate sensor as recited in claim 7, wherein at least one of: i) the first component, ii) the second component, iii) the third component, iv) the fourth component, v) the fifth component, vi) the sixth component, vii) the seventh component, and viii) the eighth component, is at least one of capacitively detectable, piezoresistively detectable, and piezoelectrically detectable.

* * * * *